US006399217B1

(12) United States Patent
Lee et al.

(10) Patent No.: US 6,399,217 B1
(45) Date of Patent: Jun. 4, 2002

(54) ARTICLE SURFACE WITH METAL WIRES AND METHOD FOR MAKING

(75) Inventors: Ching-Pang Lee, Cincinnati, OH (US); Wayne C. Hasz, Pownal, VT (US); Nesim Abuaf, Schenectady, NY (US); Robert A. Johnson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/466,957

(22) Filed: Dec. 20, 1999

(51) Int. Cl.[7] ............................ B32B 3/14; B32B 15/14
(52) U.S. Cl. ........................ 428/611; 428/614; 228/185
(58) Field of Search ................................ 428/608, 611, 428/687, 614, 601; 228/178, 185

(56) References Cited

U.S. PATENT DOCUMENTS 3,886,646 A * 6/1975 Broderson .................. 228/182
4,040,159 A * 8/1977 Darrow et al. ......... 29/156.8 H
4,381,440 A * 4/1983 Madewell .................... 219/62
5,738,493 A * 4/1998 Lee et al. ................. 416/97 R
5,797,726 A * 8/1998 Lee .......................... 416/96 R
6,142,734 A * 11/2000 Lee .......................... 416/97 R

FOREIGN PATENT DOCUMENTS

GB 2261281 A * 5/1993

* cited by examiner

*Primary Examiner*—John J. Zimmerman
(74) *Attorney, Agent, or Firm*—William Scott Andes; Lee H. Sachs

(57) ABSTRACT

A surface of an article, for example an external fluid flow surface, includes a plurality of metal wires lengthwise of the wires along the article surface. The article can be in the form of a component of an apparatus, for example a component of a gas turbine engine, the wires being bonded along and modifying surface characteristics of the article. Also, the article can be in the form of a bonding layer, for example a brazing tape, including the metal wires carried along a surface of the layer.

13 Claims, 2 Drawing Sheets

ARTICLE SURFACE WITH METAL WIRES AND METHOD FOR MAKING

BACKGROUND OF THE INVENTION

This invention relates to articles having a surface exposed to a flow of fluid, and more particularly to articles. for example components of power generating apparatus, having a surface over which a heated fluid flows.

Certain components of power generating apparatus, for example gas turbine engine components, operate in or are exposed to a heated stream of fluid such as air, products of combustion, etc. For example, surfaces of gas turbine engine blading members (including airfoils of blades and vanes), struts, and engine internal fluid-flow passages, downstream of the combustor section, are heated by a flow of fluid, including air and products of combustion, within the engine. From an engine design standpoint it is desirable to operate the engine at relatively high temperatures. Sometimes such temperatures are higher than certain metal alloys from which components are made can withstand efficiently. In such a case, components require cooling or heat dissipation from a surface to maintain component temperatures within acceptable ranges. In other situations, such cooling is required to maintain proper thermal matches between cooperating components for clearance or stress control, as is well known in the art.

To improve the overall cooling effectiveness of a component, it is desirable to have a large heat transfer surface area, particularly on the fluid flow surface exposed to a fluid that acts as a coolant. Therefore, it has been proposed to apply to, or generate in, an article surface turbulators for heat dissipation from a component. In general, turbulators are protuberances disposed on a surface to enhance heat transfer from the surface. For example, articles having turbulation, and methods for providing turbulation are described in copending U.S. patent application Ser. No. 09/304276—Hasz et al, filed May 3, 1999. Relationships between heat transfer from a surface and turbulator profile and spacing have been reported in "Effects of Turbulator Profile and Spacing on Heat Transfer and Friction in a Channel" by Taslim and Spring, (Journal of Thermophysics and Heat Transfer, Vol. 8, No. 3, July–September 1994). Impingement cooling of a textured surface of a gas turbine engine assembly is described in U.S. Pat. No. 5,353,865—Adiutori et al. (patented Oct. 11, 1994).

Heat transfer improvement from a surface including particles as turbulators is significant. However, it is desirable to have more accurate control of turbulator surface area for heat transfer from a surface, and accurate turbulator positioning and bonding to a surface. In addition, improvement of article surface strength and/or control flow of fluid across a surface with a turbulator can improve component life and efficiency.

BRIEF SUMMARY OF THE INVENTION

In one form, the present invention provides an article comprising an article surface, and a plurality of discrete metal wires bonded lengthwise of the wires along the article surface. In one embodiment, the metal wires are in the form of woven wires or wire meshes. In another embodiment, the article is a tape, for example a brazing tape, comprising a base and the plurality of metal wires carried by the base.

In still another form, the present invention provides a method for enhancing a surface an article, for example an engine service operated article, comprising bonding a plurality of discrete metal wires lengthwise of the wires along a surface of the article.

DETAILED DESCRIPTION OF THE INVENTION

Turbulators for dissipation of heat from a surface are specifically described in examples in the prior art primarily in the shape of particles of material or generally hemispherical members or buttons bonded with an article surface. In that general shape, such turbulators, while assisting in the dissipation of heat, do not strengthen an article surface or assist in controlling the flow of fluid across or along an article surface.

According to an embodiment of the present invention, a turbulator in the form of a metal wire, a woven wire, or a wire mesh, when bonded lengthwise along an article surface, provides the combination of heat dissipation from an article surface while increasing the article surface strength and potential operating life of the article. As used herein, a "wire" means an elongated member generally having a length at least about 5 times the wire cross section. In addition, particular positioning of a plurality of wires along a surface of the article over which fluid flows or on which fluid impinges provides a desired boundary layer flow control at the article surface. For example, if the wires are positioned substantially parallel to the flow, fluid is guided more smoothly over the surface, improving aerodynamic efficiency in a flow of air; if the wires are positioned at an angle to the flow. more or desired turbulence of the flow is provided. According to forms of the present invention, the degree of heat dissipation from a surface, the fluid flow over a surface. and/or the surface strength of an article can be improved and more accurately controlled. Application of such wires, including woven wires and meshes, can be made in the initial manufacture of an article or can be made after service operation.

Metal wires. which can be made such as by extrusion to relatively long lengths and a variety of sizes and cross sectional shapes, can provide strength to an article surface along the direction of the wire. Therefore, use of such a member bonded to a surface enables selection of metal or alloy, shape, size and arrangement of wires to be made appropriately for surface strengthening as well as fluid flow control, heat dissipation and, if desired, environmental protection. In one embodiment, the material from which the wires are made is different from that of the article surface. For improvement both in surface strength and heat dissipation, the wires can be made of a metal or alloy having a greater thermal conductivity and at least one mechanical strength property, for example tensile strength, greater than that of the article surface.

Figure 1:
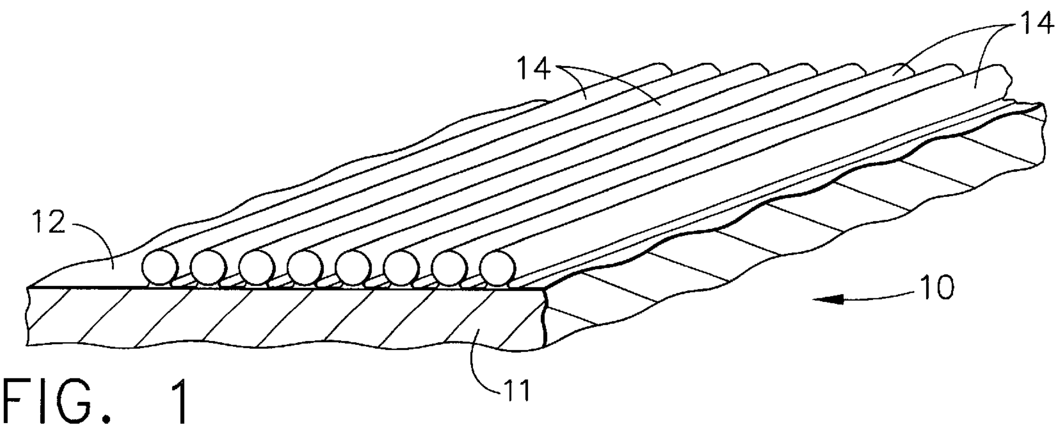
FIG. 1 is a fragmentary, sectional, perspective view of an article including a plurality of discrete metal wires of generally circular cross section bonded lengthwise along an article surface.

An embodiment of the present invention is shown in the fragmentary, sectional perspective view of FIG. 1. An article shown generally at 10 comprises a metallic substrate 11 including article surface 12. Bonded lengthwise to surface 12 is a plurality of metal wires 14, shown to be generally of circular cross section. In that embodiment, wires 14 are disposed on surface 12 in a generally parallel array, spaced-apart one from the other. However, it should be understood that, if desired or by random disposition, one or more wires 14 can be closely adjacent or touch or be bonded to one or more adjacent wires. For example, an appropriate arrangement can be made to adjust dissipation of heat from surface 12 and/or to strengthen or improve mechanical properties of surface 12. Although a generally parallel array is shown in FIG. 1, as discussed above the wires of the plurality can be disposed at an angle one to another, or the array can be in the form of woven wires or a wire mesh, for example as shown in FIGS. 5–8.

Figure 2:
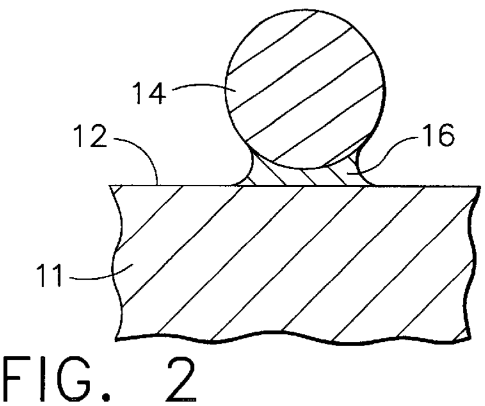
FIG. 2 is a fragmentary sectional enlarged view of a wire of FIG. 1 showing the bonding with the article surface.
Figure 3:
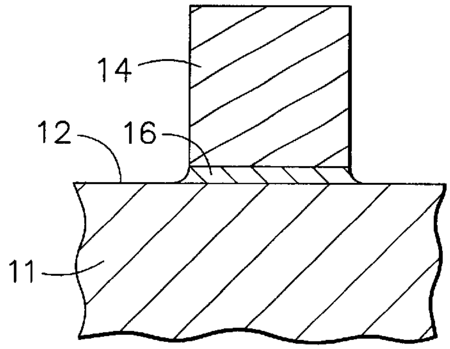
FIG. 3 is a fragmentary sectional view of a discrete wire having a generally rectangular, square cross section bonded to an article surface.
Figure 4:
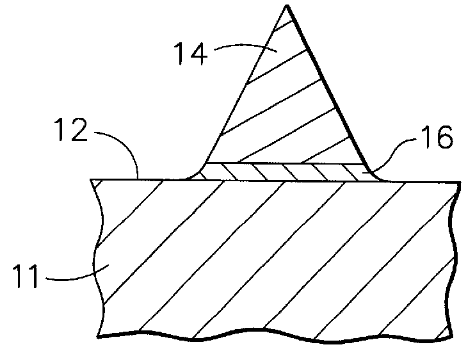
FIG. 4 is a fragmentary sectional view of a discrete wire having a generally triangular cross section bonded to an article surface.

The enlarged fragmentary sectional view of FIG. 2 shows a discrete wire 14 of the plurality of wires in FIG. 1 bonded along the length of the wire to article surface 12 through a bonding alloy 16, for example a metal brazing alloy. The enlarged fragmentary sectional views of FIG. 3 and 4 show wires 14 in different cross sectional shapes and bonded to article surface 12 through an appropriate bonding alloy 16.

Figure 6:
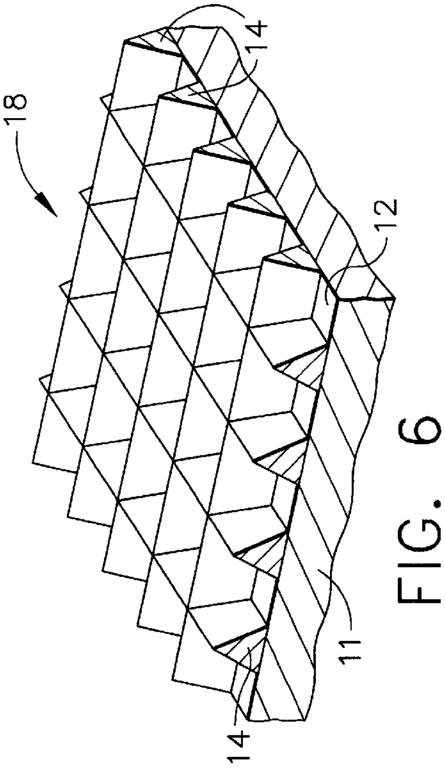
FIGS. 5, 6, 7, and 8 are fragmentary sectional perspective views in diagrammatic form of 3 dimensional generally woven wire formations or wire meshes bonded lengthwise of the wires along an article surface, the wires having rectangular, triangular (with straight or parabolic sides), or circular cross sections.
Figure 8:
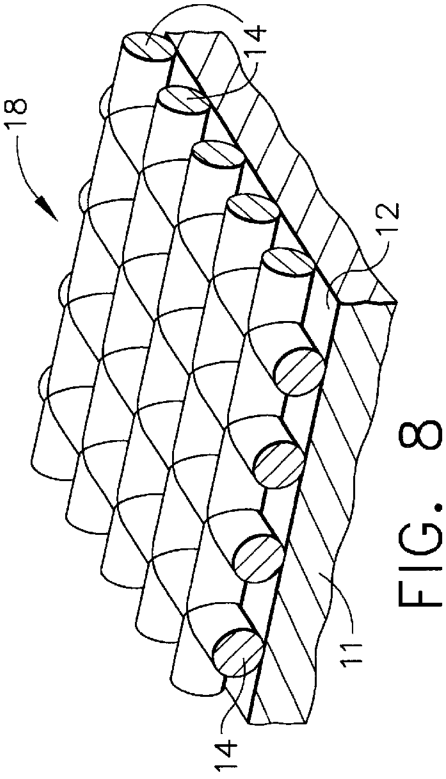
Figure 5:
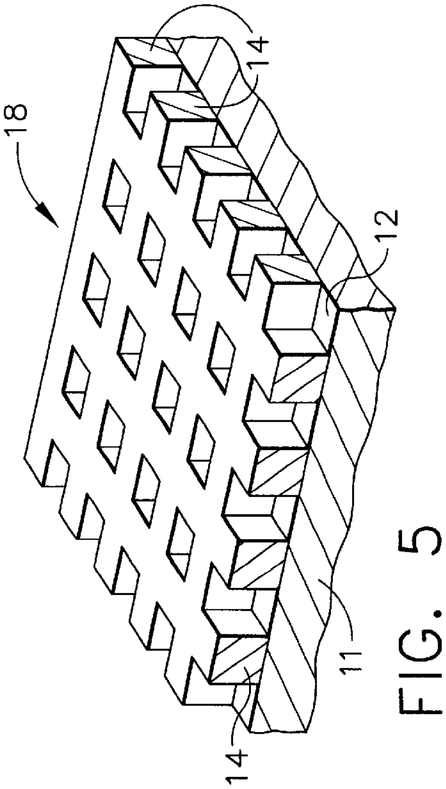
Figure 7:
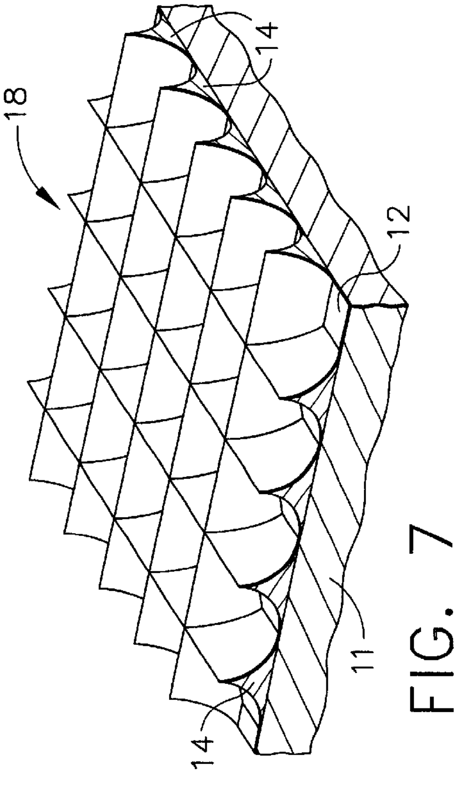

The fragmentary sectional perspective views of FIGS. 5 through 8 show, diagrammatically, various embodiments of wires 14 as woven wire formations or wire meshes, shown generally at 18, bonded with article surface 12 generally lengthwise of the wires in the wire structures. These formations provide a 3 dimensional turbulation effect for surface 12. FIG. 5 shows the wires to be generally of rectangular (for example square) cross section as in FIG. 3. FIG. 6 shows the wires to be generally of triangular cross section with substantially straight sides as in FIG. 4. FIG. 7 shows the wires to be generally of triangular cross section with substantially parabolic type sides. FIG. 8 shows the wires to be generally of circular cross section as shown in FIG. 2.

One convenient means for disposing, positioning and bonding the plurality of wires on an article surface uses a prepared brazing alloy layer, for example a brazing sheet or a tape, carrying the metal wires positioned thereon as desired. Prepared layers that include a brazing alloy have been widely described and are commonly used in the art of metal joining. One form includes a brazing alloy, appropriately selected for materials or alloys to be joined. Sometimes the brazing alloy is carried in a nonmetallic layer of material that will decompose substantially without residue upon heating to a brazing temperature. In other embodiments, the brazing alloy is in the form of an alloy without binder. Examples of such layers and materials from which they are made are widely used and described in the art, for example in the above-identified copending U.S. patent application Ser. No. 09/304276. Other means for disposing, positioning and bonding the plurality of wires on an article surface uses a braze alloy paste including a braze powder and a fugitive type binder. A variety of such pastes for brazing commercially are available. As used herein, an article comprising an article surface and a plurality of discrete metal wires, in whatever form, bonded to the surface includes, but is not limited to, a brazing portion, for example a brazing paste, brazing sheet or brazing tape, including a metal brazing alloy, carrying the wires.

One example of an article having a metal surface that can include forms of the present invention is a turbine engine component requiring cooling to maintain component temperatures within acceptable ranges or to maintain desired thermal matches for clearance or stress control. Examples of such components include turbine blades, turbine vanes, struts, shrouds, and various support structures including an external fluid or airflow surface over which a fluid flows in the form of air, alone or with products of combustion. In some embodiments, cooling fluid such as air is directed to impinge on an article surface for impingement cooling. As used herein in connection with fluid flow the term "air" is intended to include, as appropriate, air and products of combustion. Generally, such articles or surfaces are made of a high temperature alloy based on one or more of Fe, Ni and Co. For use of forms of the present invention on external fluid flow surfaces of such articles or surfaces, it is preferred that the metal wires have a cross sectional size in the range of about 0.001–0.1

One form of the present invention can be practiced to modify or enhance a surface of a service-operated article. For example, a metal external fluid flow surface of an article that has been operated in a gas turbine engine can be modified and appropriately enhanced by bonding such as by brazing, to such surface, lengthwise of the wires, the plurality of metal wires, including wires in the form of woven wires or wire meshes. Such practice can improve surface heat dissipation, improve surface strength, control surface fluid flow, etc, as discussed above.

In one evaluation of the present invention, a ⅜" outside diameter tube of a high temperature alloy commercially available as Hastalloy-X alloy was wrapped with a 0.005" thick braze tape including a fugitive binder and coated with an adhesive on one side. The braze tape included a Ni base brazing alloy of the Ni—Cr—Si type sometimes called GE81 brazing alloy. A 0.020" diameter Hastalloy-X alloy wire of generally circular cross section then was wrapped about the tube onto the braze tape with about ⅛" spacing between wire wraps. This specimen then was brazed in a vacuum furnace for 30 minutes at 2100° F. using a heating schedule increasing in steps from 550° F. to reach 2100° F. to allow the binder to decompose from the braze tape and the furnace to stabilize. In this way, the wire was bonded by brazing the wire along its length to the outside diameter of the tube and, after cooling, provided a form of the present invention.

In another evaluation of the present invention, each of a plurality of pieces of the above Hastalloy-X alloy wire was resistance spot welded lengthwise of the wire onto a surface of a 0.0015" thick Ni base alloy braze foil. Nominally the foil comprised, by weight, 19% Cr, 7.3% Si, 1.5% B, with the balance Ni. A fugitive binder was not included in the foil. This wire laden foil then was resistance spot welded onto a metal plate of an alloy sometimes referred to as GTD-222 alloy and then bonded to the plate surface by brazing in a vacuum furnace for 30 minutes at 2100° F. The Hastalloy-X wire had a thermal conductivity and tensile strength greater than that of the GTD-222 alloy surface. In this way the heat dissipation from and strength properties of the plate surface was increased. This example represents another form of the present invention.

In still another evaluation of the present invention, the above Hastalloy-X alloy wire was provided in the form of a wire screen or mesh. The mesh was resistance spot welded along the length of wires in the screen onto the surface of the 0.0015" Ni base alloy braze foil described above. The foil including the screen was vacuum brazed for 30 minutes at 2100° F. to a surface of a GTD-222 alloy plate, providing another example representing the present invention.

As was mentioned above, a variety of braze pastes including a selected brazing alloy powder and a fugitive binder commercially are available. Practice of the present invention can include applying a braze paste to a surface of an article and then imbedding the wires, in whatever form, in the paste, lengthwise of the wires prior to brazing.

The present invention has been described in connection with a variety of specific forms, shapes, embodiments, examples, methods and materials. However, it should be understood that they are intended to be typical of, rather than in any way limiting on, the scope of the present invention. Those skilled in the various arts involved will understand that the invention is capable of variations and modifications without departing from the scope of the appended claims.

What is claimed is:

1. An article for power generating apparatus, the article comprising:

an article surface which, during operation of the article in the power generating apparatus, is a surface over which a cooling fluid flows in a fluid flow direction;

the article surface being a metallic article surface having a first thermal conductivity and a first mechanical strength property; and, a plurality of metal heat transfer wires bonded lengthwise of the wires along the article surface in the fluid flow direction and exposed to the cooling fluid;

the wires being of a metal composition different from the metallic article surface and having a second thermal conductivity greater than the first thermal conductivity.

2. The article of claim 1 in which the wires have a second mechanical strength property greater than the first mechanical strength property.

3. The article of claim 1 in which the plurality of discrete metal wires are disposed substantially parallel one to another.

4. The article of claim 1 in which at least one of the plurality of wires are disposed substantially at an angle to another wire.

5. The article of claim 4 in which the wires are in a form selected from the group consisting of wire mesh and woven wires.

6. The article of claim 1 in which at least one of the plurality of wires is bonded at an angle to the fluid flow direction.

7. The article of claim 1 in the from of a gas turbine engine article in which:

the fluid flow surface is an external surface of the article over which air flows in an airflow direction; and, the wires are bonded to the external surface generally along the airflow direction.

8. The article of claim 1 in the form of a gas turbine engine article in which:

the fluid flow surface is an external surface of the article over which air flows in airflow direction; and, at least one of the plurality of wires is disposed substantially at an angle to another wire.

9. The article of claim 8 in which the wires are in a form selected from the group consisting of wire mesh and woven wires.

10. A method of modifying an external metallic fluid flow surface of a service operated power generating apparatus article over which, during operation of the article in a power generating apparatus, a cooling fluid flows over the external fluid flow surface in a fluid flow direction, the metallic fluid flow surface having a first thermal conductivity, the method comprising:

selecting a plurality of metal heat transfer wires of a composition different from the metallic fluid flow surface and having a second thermal conductivity greater than the first thermal conductivity; and, increasing a surface area of the external fluid flow surface to enhance heat transfer therefrom by bonding a plurality of metal wires lengthwise of the wires along the external fluid flow surface in the fluid flow direction.

11. The method of claim 10 in which the plurality of metal wires are disposed substantially parallel one to another.

12. The method of claim 10 in which at least one of the plurality of wires is disposed substantially at an angle to another wire.

13. The method of claim 10 in which the wires are in a form selected from the group consisting of wire mesh and woven wires.

* * * * *